March 9, 1954  M. C. PETERS ET AL  2,671,403
HYDRAULIC TRANSMISSION

Filed Aug. 4, 1947  4 Sheets-Sheet 1

INVENTORS,
Maurice C. Peters,
Harold B. Adams,
BY
Roy E. Hamilton,
Attorney.

March 9, 1954 M. C. PETERS ET AL 2,671,403
HYDRAULIC TRANSMISSION

Filed Aug. 4, 1947 4 Sheets-Sheet 2

INVENTORS,
*Maurice C. Peters,*
BY *Harold B. Adams.*

*Roy E. Hamilton,*
*Attorney.*

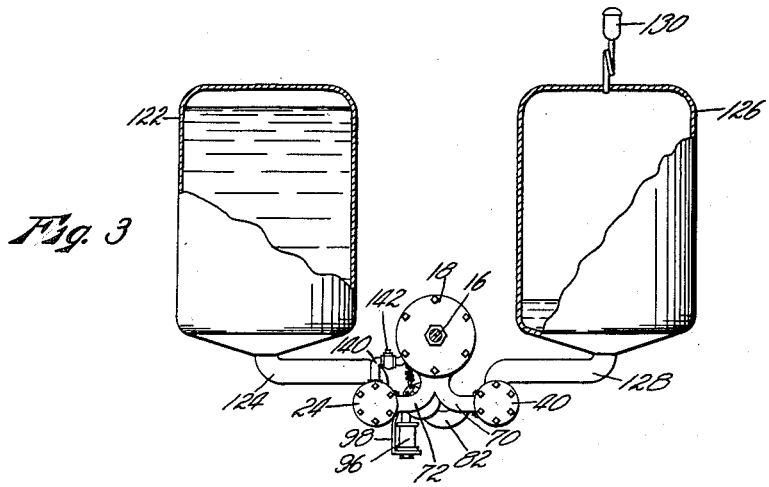
Fig. 3
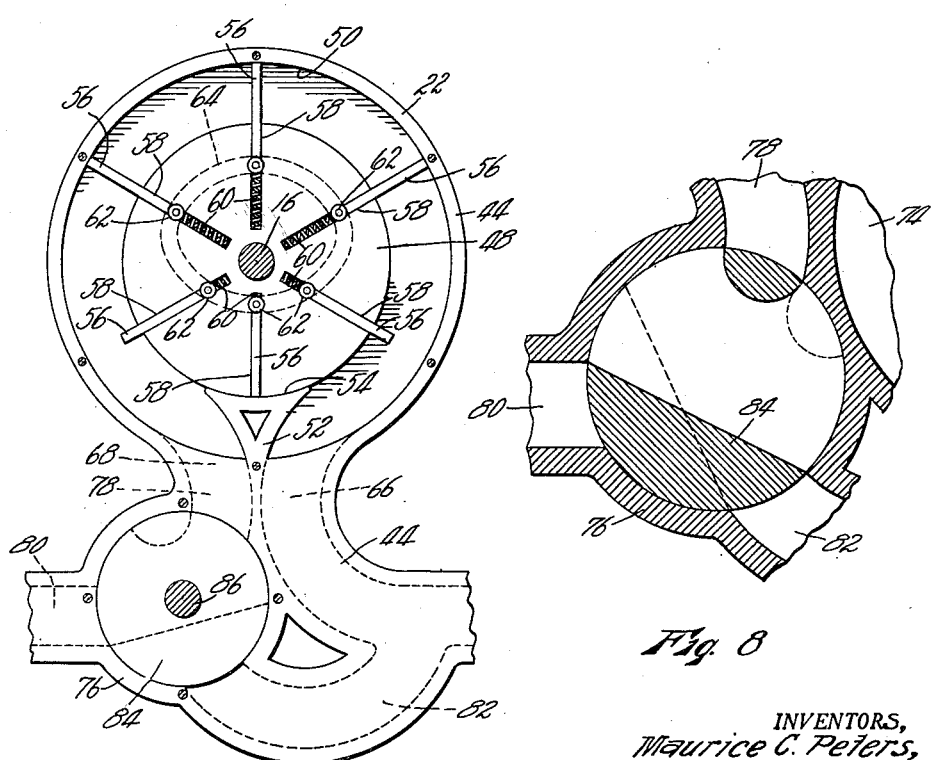
Fig. 7
Fig. 8
INVENTORS,
Maurice C. Peters,
BY Harold B. Adams.
Roy E. Hamilton,
Attorney.

March 9, 1954　　　M. C. PETERS ET AL　　　2,671,403
HYDRAULIC TRANSMISSION
Filed Aug. 4, 1947　　　　　　　　　　　　4 Sheets-Sheet 4
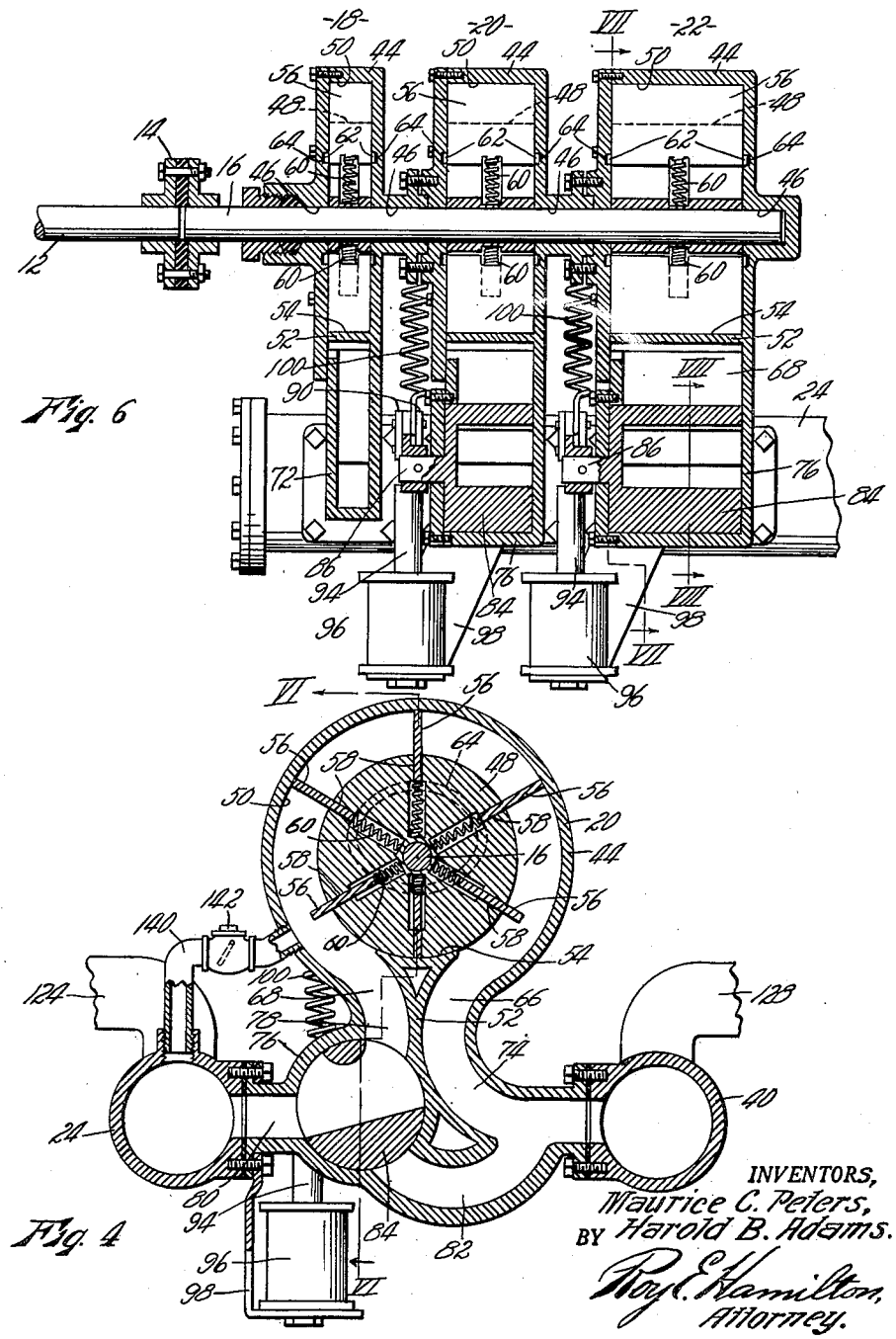

Patented Mar. 9, 1954

2,671,403

UNITED STATES PATENT OFFICE 2,671,403

HYDRAULIC TRANSMISSION

Maurice C. Peters, Salt Lake City, Utah, and
Harold B. Adams, Mission, Kans.

Application August 4, 1947, Serial No. 765,943

5 Claims. (Cl. 103—11)

This invention relates to new and useful improvements in a hydraulic transmission, and has particular reference to a transmission suitable for transferring power from an automobile engine to fluid motors adapted to propel said automobile.

The principal object of the present invention is the provision, in an automobile, of a power unit, a closed hydraulic circuit, and means operable by said power unit to actuate said hydraulic circuit to propel said automobile.

Another object is the provision in an automobile, of a power unit, and a closed hydraulic circuit including a hydraulic motor adapted to propel said automobile and a pump driven by said power unit and adapted to furnish fluid to said hydraulic motor.

Still another object is the provision, in an automobile, of a power unit, a plurality of hydraulic pumps driven by said power unit and connected in parallel in a closed hydraulic circuit, a plurality of hydraulic motors included in said hydraulic circuit and adapted to be driven thereby to propel said automobile, and means whereby said pumps may be successively by-passed or inserted in said hydraulic circuit to furnish more or less fluid to said hydraulic motors.

A further object is the provision in a hydraulic automobile transmission of the class described having a plurality of pumps connected in parallel in a hydraulic circuit including a plurality of hydraulic motors, of automatic means responsive to the speed of said motors for successively inserting said pumps in said circuit or successively by-passing said pumps, thereby providing a greater or less flow of fluid to said motors.

Another object is the provision, in a hydraulic transmission for an automobile of the class described, of a closed hydraulic circuit including a pump and a plurality of hydraulic motors, said motors being connected in parallel relation whereby they may be driven at different speeds.

Another object is the provision, in a hydraulic circuit of the class described including non-reversible pumps and reversible hydraulic motors adapted to be driven by said pumps, of a manually operable control valve inserted in said circuit whereby the flow of fluid therein to said motors may be reversed, or by-passed around said motors, or throttled to brake said motors.

Other objects are simplicity and economy of construction, ease and efficiency of operation, and adaptability to furnish either a two-wheel or four-wheel drive for an automobile.

With these objects in view, as well as other objects which will appear in the course of the specification, reference will be had to the drawings, wherein:

Fig. 3 is a vertical section taken on line III—III of Fig. 1, partially broken away.

Fig. 4 is an enlarged fragmentary section taken on line IV—IV of Fig. 1.

Fig. 5 is an enlarged fragmentary section taken on line V—V of Fig. 1.

Fig. 6 is a fragmentary vertical section taken on line VI—VI of Fig. 4.

Fig. 7 is an enlarged fragmentary section taken on line VII—VII of Fig. 6.

Fig. 8 is an enlarged segmental section taken on line VIII—VIII of Fig. 6, with the pump control valve shown in the by-pass position in dotted lines.

Fig. 9 is a schematic diagram of the electrical circuit adapted to operate the pump control valves.

Figure 1:
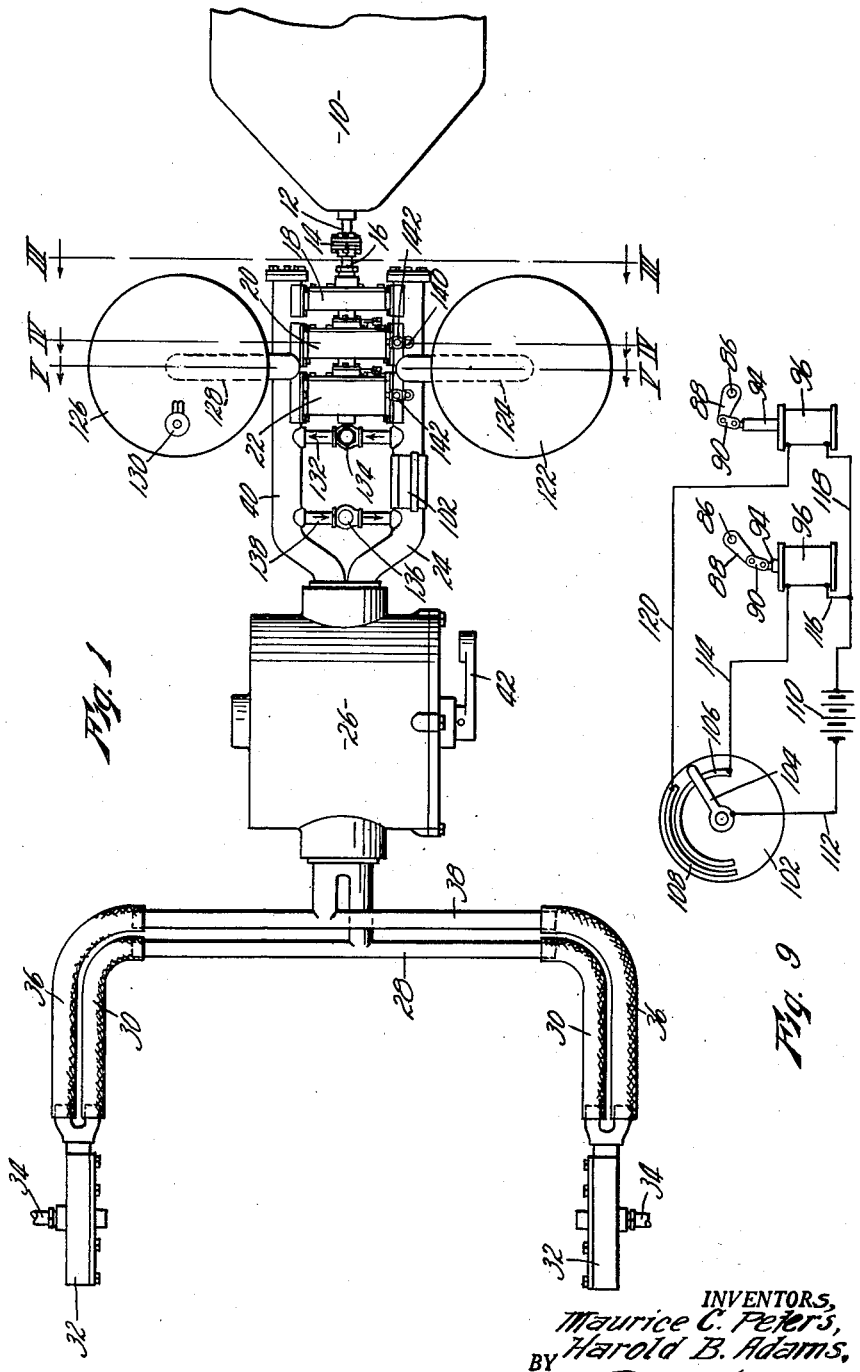
Figure 1 is a schematic plan view of a hydraulic power system for driving an automobile, including a hydraulic transmission, embodying the present invention.

Like reference numerals apply to similar parts throughout the several views, and the numeral 10 refers to the gasoline engine of an automobile, the shaft 12 thereof being connected by flexible coupling 14 to the common central drive shaft 16 of rotary fluid pumps 18, 20 and 22, hereinafter described, said pumps being successively of larger capacity, and being rigidly mounted in tandem to the frame of the automobile by means not shown.

The delivery outlets of said pumps are connected to high pressure header 24. Fluid pumped into said header passes through control valve 26, pipe 28, and flexible conduits 30 to rotary fluid motors 32, driving said motors. The shafts 34 of said motors are directly connected to the rear wheels of the automobile. Fluid exhausted from said motors returns through flexible conduits 36, pipe 38, control valve 26, and low pressure header 40 to the intake openings of pumps 18, 20 and 22.

Rotary fluid motors 32, which are reversible by reversing the flow of the driving fluid, and control valve 26 may be of the types fully set forth and described in our application for Letters Patent for Rotary Fluid Motor, Ser. No. 765,944, filed August 4, 1947, now abandoned. Control valve 26, which is manually operable by lever 42 is a rotary plug valve provided with passageways through which fluid may be directed as above described to propel the car forwardly. When lever 42 is turned through a partial revolution, fluid under pressure then flows from header 24 to pipe 38 and thence to motors 32 to drive them in a reverse direction, and the exhaust fluid flows from pipe 28 to header 40. When lever 42 is turned to an intermediate or neutral position header 24 is by-passed directly to header 40 and pipe 28 is by-passed directly to pipe 38, thus completely disconnecting the pumps and the motors. By turning lever 42 gradually from any of the above positions, the flow of fluid through the valve is gradually throttled until it is completely stopped. In this manner motors 32, and hence the automobile, may be braked and stopped. Lever 42 is operated from the driver's compartment of the automobile by suitable linkage not shown.

As best shown in Figs. 4, 5, 6 and 7, each of pumps 18, 20 and 22 is substantially similar to motors 32, except that they are driven by engine 10 instead of by fluid under pressure, and hence act as pumps instead of motors. Each of said pumps has a housing 44 the upper portion of which forms a relatively short hollow cylinder. Shaft 16 extends axially through said cylinders and is carried for rotation in suitable bearings 46 formed integrally with said housing. A cylindrical rotor 48 is rigidly mounted concentrically on shaft 16 within each of said housings, said rotor fitting snugly but rotatably between the end walls of said housings and being of smaller diameter than said housings, thereby leaving an annular passageway 50 around said rotor. A partition 52 having an arcuate bearing surface 54 adapted to bear against the cylindrical surface of rotor 48, extends between the end walls of each housing 44 adjacent the bottom thereof.

A plurality of vanes 56 is slidably carried in radial slots 58 formed in rotor 48 at spaced intervals therearound. Said vanes are substantially planar, fit slidably between the end walls of housings 44, and each of said vanes is urged outwardly against the cylindrical inner surface of housing 44 by means of a compression spring 60 carried in rotor 48. A small roller 62 is carried for rotation on each of the radially extending edges of vanes 56, being adapted to rotate in a plane parallel with the direction of movement of said vane in slot 58. Said rollers extend outwardly into substantially elliptical grooves 64 cut in the inner faces of the end walls of housing 44, as best indicated in Fig. 7. The upper portions of said grooves are formed concentrically with shaft 16, and therefore, permit vanes 56 to bear firmly against housing 44 during that portion of each revolution. Rollers 62 have sufficient clearance in grooves 64 so as not to interfere with the vanes sliding against the inner surface of housing 44. The lower portion of each of grooves 64 is eccentric to shaft 16, and forces rollers 62 and vanes 56 inwardly toward said shaft against the pressure of the associated springs 60. Said vane is withdrawn completely into rotor 48 as it passes partition 52. The upper and lower portions of grooves 64 are connected by smoothly curved end portions to move vanes 56 gradually between their limits of travel.

Thus as fluid enters annular passage 50 at inlet port 66, portions thereof will be trapped between successive vanes 56 as they move outwardly to contact housing 44, and will be forced by said vanes through said passageway under pressure to the outlet port 68. One of the chief advantages of this pump construction is that the outer ends of vanes 56 contact a wall of constant radius, and at a constant angle. The sharp edges of said vane are therefore not worn off as they would be if the vanes moved over an uneven surface, and therefore, the efficiency and life of the pump are greatly increased.

The lower portion of housing 44 of pump 18 is formed to present a passageway 70 interconnecting inlet port 66 with low pressure header 40, and a passageway 72 interconnecting outlet port 68 with high pressure header 24, as shown in Fig. 3. Therefore, pump 18 delivers fluid under pressure to header 24 as long as engine 10 turns.

The housings 44 of pumps 20 and 22 are formed to present passageways 74 interconnecting inlet ports 66 with low pressure header 40. Said housings are also formed to present a rotary plug valve chamber 76 respectively interconnected with outlet port 68, high pressure header 24, and passageway 74 by means of passageways 78, 80, and 82. The valve plug 84 is provided with a single port through which fluid may be directed from outlet port 68 to either passageway 80 or passageway 82. When the rotary plug 84 is positioned as in Fig. 4, fluid is conveyed from passageway 78 to passageway 80 and hence to the header 24. When valve 84 is rotated in a clockwise direction as viewed in Fig. 4 to the position shown in dotted lines in Fig. 8, fluid is conveyed from passageway 78 to passageway 82 and is hence by-passed back to the inlet side of the pump. From the valve position shown in solid lines in Fig. 8, showing valve 84 at the mid-point position, it will be seen that passageway 80 is completely closed before passageway 82 begins to open. Hence, high pressure fluid can never be by-passed from header 24 to header 40 through these valves.

Valves 84 are provided with stub shafts 86 extending outwardly from chamber 76, and to the extended ends of said shafts are rigidly connected cranks 88 by means of which valves 84 may be oscillated, as best shown in Fig. 5. Each of said cranks is pivotally connected by means of links 90 to an extension 92 of the armature 94 of a solenoid 96 carried rigidly by a bracket 98 fixed to header 24. A tension spring 100 fixed at one end to crank 88 and at its other end to housing 44 of the associated pump, works in opposition to solenoid 96 and normally retains valve 84 in the by-pass position shown in dotted lines in Fig. 8. When a solenoid 96 is energized, the associated valve 84 is turned to the position shown in Fig. 4.

Figure 2:
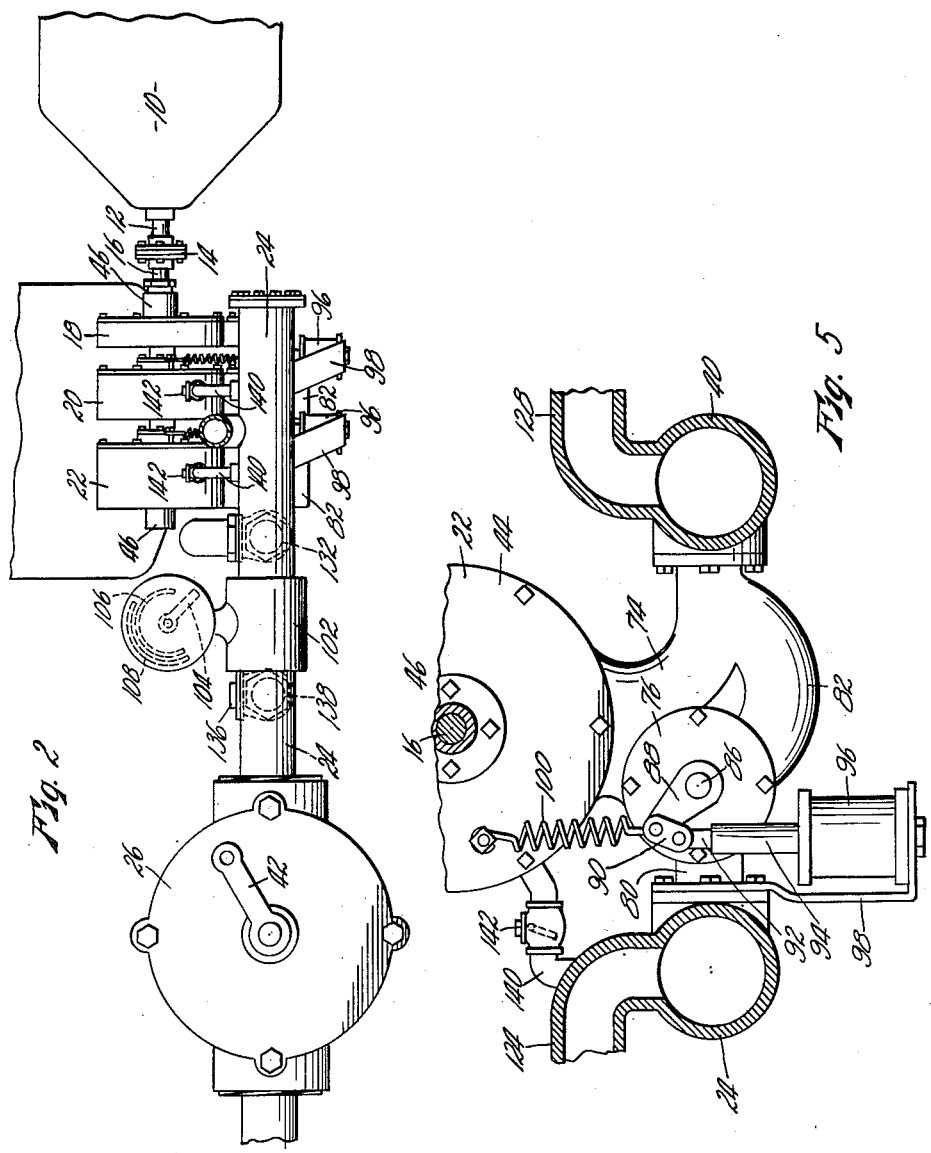
Fig. 2 is a fragmentary enlarged side elevation of the transmission.

Electrical current is furnished to solenoid 96 by means of the circuit shown in Fig. 9. A flowmeter 102 of the open-channel type is installed in header 24 below all of the pumps, as shown in Figs. 1 and 2. The flowmeter may be of any commercially standard type, the pertinent feature as far as this invention is concerned being that it has a rotatable contact arm 104 the position of which is responsive to the rate of fluid flow through header 24, and a pair of arcuate contact strips 106 and 108 of unequal length adapted to be contacted successively by arm 104.

When engine 10 is not operating and no oil is being pumped, arm 104 will not touch either arcuate contact 106 or 108 and neither solenoid will be energized. When engine 10 is started pump 18 will supply fluid under pressure to header 24 and hence to motors 32 as previously described, to propel the automobile. Pump 18 has the smallest capacity, and hence will deliver oil under greater pressure than either of pumps 20 or 22. This corresponds to first position in a standard geared transmission.

When the flow of fluid through header 24 has reached a predetermined volume, arm 104 of flowmeter 102 will contact strip 106, and current will flow from battery 110 through wire 112, arm 104, strip 106, wire 114, solenoid 96 associated with pump 20, wire 116, and wire 118. The solenoid, thus energized will operate valve 84 to direct fluid pumped by pump 20 into header 24. Since both pumps 18 and 20 are now pumping fluid into header 24, a greater volume of fluid will be supplied, but under less pressure. This corresponds to the second position of a standard geared transmission. When the flow of fluid through header 24 reaches a still higher predetermined volume, arm 104 will contact strip 108, and without interrupting the current to the solenoid associated with pump 20, current will flow through wire 120 to solenoid 96 associated with pump 22. Valve 84 is actuated thereby to direct fluid pumped by pump 22 to header 24. Since all three pumps are now supplying fluid to header 24, a maximum volume of fluid will be pumped, but under a still lower pressure. This corresponds to third position or high gear in a standard automobile transmission. Although a three-speed transmission is shown, it is evident that any number of speeds could be used. As the speed of the car, and hence the volume of fluid pumped, is reduced, pumps 20 and 22 will be successively by-passed by valves 84.

A surge tank 122 is interconnected with header 24 by pipe 124. It is closed to the atmosphere and serves to cushion shocks in the high pressure lines which would be caused by operation of the various valves. A storage tank 126 is interconnected with low pressure header 40 by means of pipe 128, and is opened to the atmosphere by means of vent fitting 130. The low pressure lines hence operate always at atmospheric pressure.

High pressure header 24 and other high pressure lines are protected from damage caused by excessive pressure by means of a by-pass connection 132 between the headers 24 and 40 in which is interconnected a relief valve 134 set to open when the pressure in header 24 exceeds a predetermined maximum safe limit. A check valve 136 is interconnected in by-pass connection 138 between headers 24 and 40. Said check valve opens to permit flow of fluid from the low pressure header to the high pressure header whenever the pressure in the former exceeds that in the latter. This could occur when the automobile coasts, since motors 32 would then act as pumps, returning fluid to header 24 faster than supplied by pumps 18, 20 and 22. When this happens, the level of fluid in tank 126 will rise above that in tank 122, and this added head of pressure in tank 126 will cause check valve 136 to open.

Referring to Figs. 4 and 8, it will be seen that operation of plug valves 84 will cause a shock in the fluid flow since at one point in the operation of said valve the flow of fluid therethrough is completely cut off. This occurs at the position shown in dotted lines in Fig. 8. This shock is eliminated by a by-pass 140 interconnecting the high pressure side of said pumps with header 24, a check valve 142 being inserted in each of said by-passes. Said check valve permits flow from the pump to the header whenever the pump pressure rises due to the cut-off by valve 84, but closes instantly when valve 84 opens passageway 92, since at that instant the pump pressure drops substantially to atmospheric level.

Since there is a separate fluid motor 32 for each automobile wheel, and since said motors are connected in parallel in the hydraulic circuit, the need for a separate differential to allow different wheels to turn at different speeds is eliminated. When resistance is applied to the rotation of one wheel, as for example to the inside wheel of a car making a turn, there will still be an equal turning force on each wheel, since the fluid pressure to all of the wheels is necessarily equal. Therefore, the wheel to which resistance is applied will turn more slowly, and the fluid motor associated therewith will pump less fluid. The excess fluid will flow to the motor driving the outside wheel of the car, causing it to turn said wheel more rapidly. While only a two-wheel drive is shown in the drawings, it is apparent that the system is peculiarly suited to a four-wheel drive. Since each motor may be mounted to move with the wheel driven by it, and since the only necessary connections between the motors and the transmission may be made with flexible tubing, most of the difficulties of providing mechanical drives from a motor to steerable and independently mounted front wheels are eliminated.

What we claim as new and desire to protect by Letters Patent is:

1. In a device of the character described including a pumping device in a hydraulic circuit, a pumping device comprising a plurality of pumps driven by a single power unit, and connected in parallel in said circuit, at least one of said pumps being connected directly in said circuit and the other of said pumps having valves associated therewith whereby the fluid delivered by each of said last named pumps may individually be directed to or by-passed around said hydraulic circuit, said automatic means responsive to the rate of fluid flow in said circuit for successively operating said valves.

2. In a device of the character described including a pumping device in a hydraulic circuit, a pumping device comprising a plurality of pumps of graduated capacities driven by a single power unit and connected in parallel in said circuit, the pump of smallest capacity being connected directly in said circuit, and the remainder of said pumps having valves associated therewith whereby the fluid delivered by each of said last named pumps may individually be directed to or by-passed around said hydraulic circuit, and automatic means responsive to the rate of fluid flow in said circuit for successively operating said valves.

3. In a device of the character described, including a pumping device in a hydraulic circuit, a pumping device comprising a plurality of pumps driven by a single power unit and connected in parallel in said circuit, at least one of said pumps being connected directly in said circuit and the other of said pumps having valves associated therewith whereby the fluid delivered by each of said last named pumps may individually be directed to or by-passed around said hydraulic circuit, a flowmeter for measuring the rate of fluid flow in said circuit, and means operable by said flowmeter at predetermined flow levels for successively operating said valves.

4. In a power transmission, a plurality of power driven hydraulic pumps adapted to be connected in parallel in a hydraulic circuit, a flowmeter disposed in the common delivery line of said pumps for continuously measuring the rate of fluid flow in said hydraulic circuit and valves associated with certain of said pumps and operable by said flowmeter at predetermined flow rates to successively insert or by-pass said pumps in said hydraulic circuit.

5. In a power transmission, a plurality of power driven, tandem-connected hydraulic pumps of graduated capacities adapted to be connected in parallel in a hydraulic circuit, a flowmeter disposed in the common delivery line of said pumps for continuously measuring the rate of fluid flow in said hydraulic circuit, and valves associated with certain of said pumps and operable by said flowmeter at predetermined flow rates to successively insert or by-pass said pumps in said hydraulic circuit.

MAURICE C. PETERS.
HAROLD B. ADAMS.

References Cited in the file of this patent

UNITED STATES PATENTS

| Number | Name | Date |
|---|---|---|
| 757,039 | Herreshoff | Apr. 12, 1904 |
| 1,047,329 | Sundh | Dec. 17, 1912 |
| 1,269,338 | Tourreil | June 11, 1918 |
| 1,723,493 | Schotthoefer | Aug. 6, 1929 |
| 1,926,692 | Tarbox | Sept. 12, 1933 |
| 1,977,033 | Adams | Oct. 16, 1934 |
| 1,999,288 | Fjellstedt | Apr. 30, 1935 |
| 2,074,618 | Roeder | Mar. 23, 1937 |
| 2,276,895 | Vosseler et al. | Mar. 17, 1942 |